US011412035B2

(12) United States Patent
Welch et al.

(10) Patent No.: US 11,412,035 B2
(45) Date of Patent: Aug. 9, 2022

(54) METHODS FOR PROVIDING UNIFIED CONTROL AND MANAGEMENT OF TASKS IN A MULTI-PLATFORM ENVIRONMENT AND DEVICES THEREOF

(71) Applicant: JPMorgan Chase Bank, N.A., New York, NY (US)

(72) Inventors: Gary Welch, Upper Saddle River, NJ (US); Frank Lee, Port Washington, NY (US); Jeffrey Drew, Buchillon (CH); Riad Mekmouche, Geneva (CH); Oleg Gerts, Staten Island, NY (US); Whitney Greene, Winter Park, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 216 days.

(21) Appl. No.: 16/425,336

(22) Filed: May 29, 2019

(65) Prior Publication Data

US 2019/0387050 A1 Dec. 19, 2019

Related U.S. Application Data

(60) Provisional application No. 62/685,094, filed on Jun. 14, 2018.

(51) Int. Cl.
*H04L 67/1012* (2022.01)
*G06F 9/50* (2006.01)
*G06F 9/48* (2006.01)
*H04L 67/1014* (2022.01)

(52) U.S. Cl.
CPC ........ *H04L 67/1012* (2013.01); *G06F 9/4881* (2013.01); *G06F 9/5072* (2013.01); *H04L 67/1014* (2013.01)

(58) Field of Classification Search
None
See application file for complete search history.

(56) References Cited

U.S. PATENT DOCUMENTS

| | | | | |
|---|---|---|---|---|
| 9,483,785 | B1* | 11/2016 | Corley | H04L 47/82 |
| 9,614,784 | B1* | 4/2017 | Houston | H04L 47/823 |
| 2008/0301296 | A1* | 12/2008 | York | G06Q 10/06 709/225 |
| 2009/0077217 | A1* | 3/2009 | McFarland | G06Q 10/06 709/223 |
| 2017/0235940 | A1* | 8/2017 | McEwen | G06F 9/50 726/19 |

* cited by examiner

*Primary Examiner* — Eric C Wai
(74) *Attorney, Agent, or Firm* — Greenblum & Bernstein, P.L.C.

(57) ABSTRACT

Systems and methods for managing tasks in a multi-platform environment are provided. The methods include allocating a set of tasks to a server device; receiving a request for servicing one or more tasks; determining whether rules that are applicable to the tasks have been satisfied; and, based on the determination regarding the rules, either automatically servicing the tasks or transmitting the tasks to the server device for servicing and then receiving a notification of completion of the tasks. Additional tasks may be allocated to additional server devices.

20 Claims, 8 Drawing Sheets

METHODS FOR PROVIDING UNIFIED CONTROL AND MANAGEMENT OF TASKS IN A MULTI-PLATFORM ENVIRONMENT AND DEVICES THEREOF

CROSS-REFERENCE TO RELATED APPLICATIONS

This application claims the benefit of U.S. Provisional Patent Application Ser. No. 62/685,094, filed Jun. 14, 2018, which is hereby incorporated by reference in its entirety.

BACKGROUND

1. Field of the Disclosure

This technology generally relates to methods of and systems for managing tasks in a multi-platform environment.

2. Background Information

In a large organization, there is typically a large number of users that use various types of computer devices and various system platforms. In order to facilitate efficient and productive use of these devices and platforms, the organization may have a staff of information technology personnel and/or system administration personnel that endeavor to assist users with system modifications and problem resolutions.

In order to perform their duties, such personnel require privileged access to all platforms in the organization. In addition, such personnel must utilize multiple tools and specialized training for each platform. As a result of such access, there may be a security risk to the organization. Also, especially when the number of platforms is relatively large, there may be a difficulty in tracking the status of all administrative tasks across all platforms.

Therefore, in view of the above, there is an unmet need for systems for and methods for managing tasks in a multi-platform environment in a manner that reduces security risks and increases efficiency with respect to tracking the status of each platform.

SUMMARY

The present disclosure, through one or more of its various aspects, embodiments, and/or specific features or sub-components, provides, inter alia, various systems, servers, devices, methods, media, programs, and platforms for managing tasks in a multi-platform environment. The various aspects, embodiments, features, and/or sub-components provide optimized processes of managing tasks in a multi-platform environment.

According to an aspect of the present disclosure, a method for managing tasks in a multi-platform environment text is provided. The method is implemented by a processor on a computing device. The method includes: allocating, from among a plurality of tasks, a first set of tasks to a first server device from among a plurality of server devices; receiving, from a client device, a request for servicing at least one task from among the first set of tasks; determining whether at least one rule applies to the at least one task, and whether each of the at least one rule is satisfied; when each of the at least one rule is satisfied, automatically servicing the at least one task; and when at least one of the at least one rule is not satisfied, transmitting the at least one task to the first server device for servicing, and receiving, when the at least one task has been serviced, a notification of completion of the at least one task.

The plurality of tasks may include at least one from among adding a database service account, deleting a database service account, and resetting an access password.

The allocating may include using a respective device identifier that is included in each task from among the plurality of tasks to determine a corresponding server device from among the plurality of server devices for the respective task.

Each respective device identifier may include an Internet protocol (IP) address of the corresponding server device.

The at least one rule may include an authentication rule that relates to determining whether a user for the at least one task is an authorized user.

When the at least one of the at least one rule is not satisfied, the method may further include querying, prior to the transmitting the at least one task to the first server for servicing, the first server device to determine whether the first server device has sufficient resources to service the at least one task, and when a determination is made that the first server device is overloaded, transmitting the at least one task to a task queueing database, and after a predetermined time interval has passed, querying the first server device to determine whether the sufficient resources to service the at least one task have become available.

When the at least one of the at least one rule is not satisfied, the method may further include querying, after the transmitting the at least one task to the first server device for servicing, the first server device with respect to whether the at least one task has been completed.

The method may further include using the notification of completion of the at least one task to verify that the at least one task has been completed and storing, in a task status database, information that indicates a status of the at least one task.

The information that indicates the status of the at least one task may include information that indicates whether the at least one task is currently being serviced, information that indicates whether the at least one task has been completed, and information that indicates whether the at least one task has been placed in a queue.

The method may further include determining, for each respective task included in the plurality of tasks, a corresponding server device from among the plurality of server devices, and allocating each respective task to the corresponding server device.

According to another aspect of the present disclosure, a computing device configured to implement an execution of a method for managing tasks in a multi-platform environment is provided. The computing device includes a display screen, a processor, a memory, and a communication interface coupled to each of the processor, the memory, and the display screen. The processor is configured to: allocate, from among a plurality of tasks, a first set of tasks to a first server device from among a plurality of server devices; receive, from a client device, a request for servicing at least one task from among the first set of tasks; determine whether at least one rule applies to the at least one task, and whether each of the at least one rule is satisfied; when each of the at least one rule is satisfied, automatically service the at least one task; and when at least one of the at least one rule is not satisfied, transmit the at least one task to the first server device for servicing, and receive, when the at least one task has been serviced, a notification of completion of the at least one task.

The plurality of tasks may include at least one from among adding a database service account, deleting a database service account, and resetting an access password.

The processor may be further configured to use a respective device identifier that is included in each task from among the plurality of tasks to determine a corresponding server device from among the plurality of server devices for the respective task.

Each respective device identifier may include an Internet protocol (IP) address of the corresponding server device.

The at least one rule may include an authentication rule that relates to determining whether a user for the at least one task is an authorized user.

When the at least one of the at least one rule is not satisfied, the processor may be further configured to query, prior to transmitting the at least one task to the first server device for servicing, the first server device to determine whether the first server has sufficient resources to service the at least one task, and when a determination is made that the first server device is overloaded, to transmit the at least one task to a task queueing database, and after a predetermined time interval has passed, to query the first server device to determine whether the sufficient resources to service the at least one task have become available.

When the at least one of the at least one rule is not satisfied, the processor may be further configured to query, after transmitting the at least one task to the first server for servicing, the first server device with respect to whether the at least one task has been completed.

The processor may be further configured to use the notification of completion of the at least one task to verify that the at least one task has been completed, and to store, in a task status database, information that indicates a status of the at least one task.

The information that indicates the status of the at least one task may include information that indicates whether the at least one task is currently being serviced, information that indicates whether the at least one task has been completed, and information that indicates whether the at least one task has been placed in a queue.

The processor may be further configured to determine, for each respective task included in the plurality of tasks, a corresponding server device from among the plurality of server devices, and to allocate each respective task to the corresponding server device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
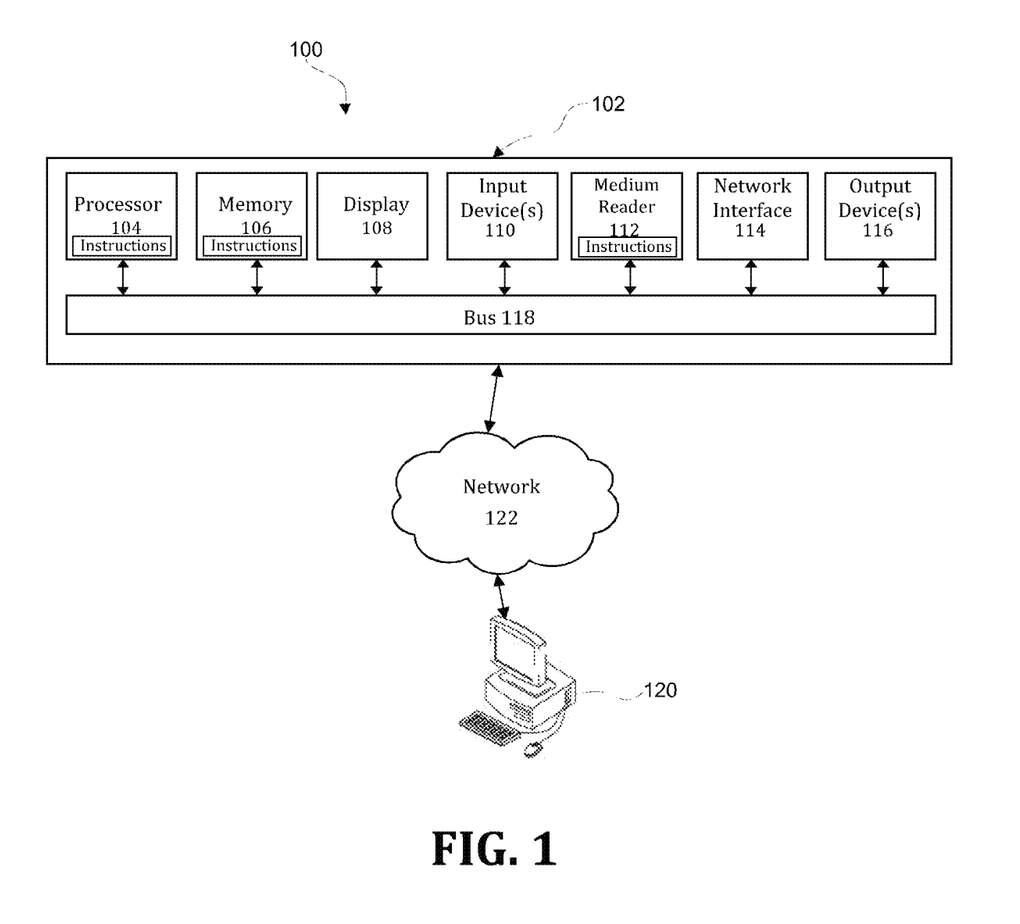
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of managing tasks in a multi-platform environment.

Figure 2:
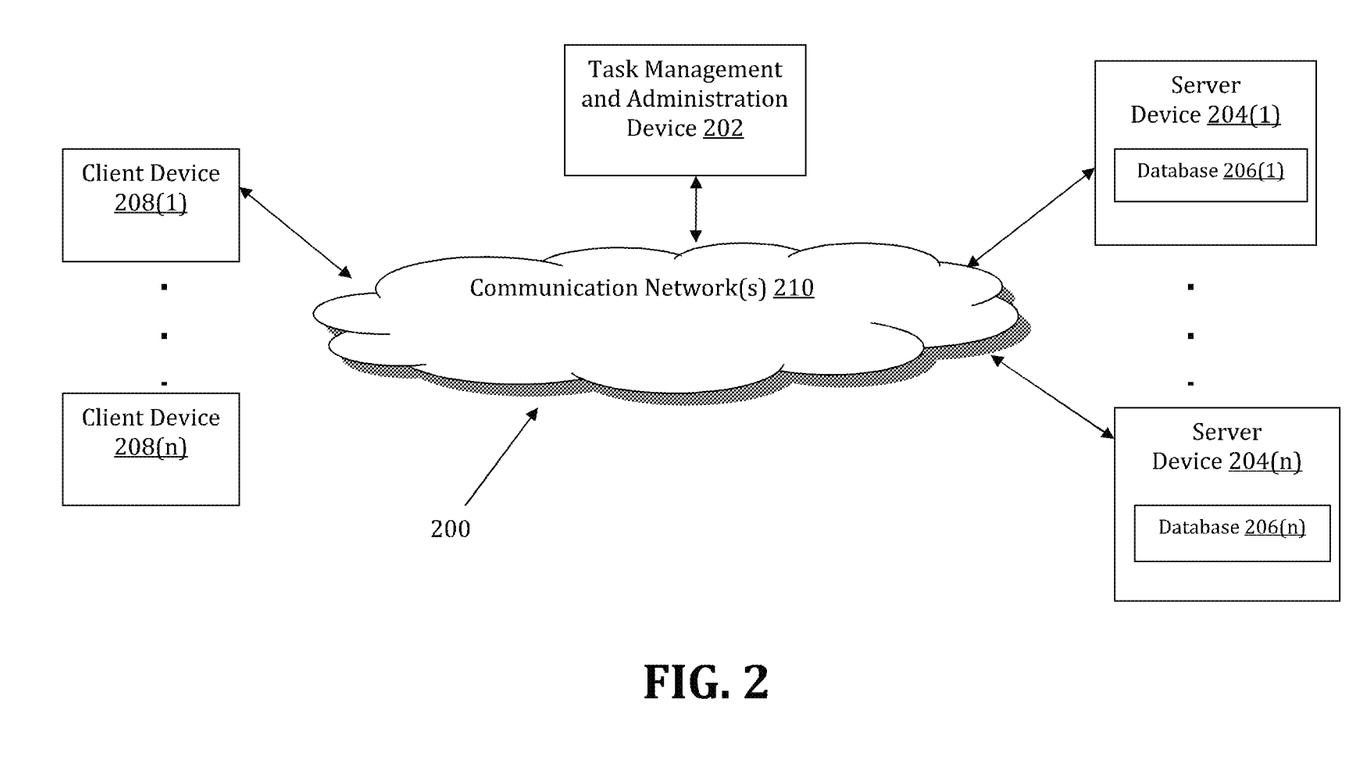
FIG. 2 illustrates an exemplary diagram of a network environment.

Referring to FIG. 2, a schematic of an exemplary network environment 200 for implementing a method for managing tasks in a multi-platform environment is illustrated. In an exemplary embodiment, the method is executable on any networked computer platform, such as, for example, a wireless mobile communication device, i.e., a smart phone.

The method for managing tasks in a multi-platform environment may be implemented by a Task Management and Administration (TMA) device 202. The TMA device 202 may be the same or similar to the computer system 102 as described with respect to FIG. 1. The TMA device 202 may store one or more applications that can include executable instructions that, when executed by the TMA device 202, cause the TMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TMA device 202 itself, may be located in virtual server(s) running in a cloud-based computing environment rather than being tied to one or more specific physical network computing devices. Also, the application(s) may be running in one or more virtual machines (VMs) executing on the TMA device 202. Additionally, in one or more embodiments of this technology, virtual machine(s) running on the TMA device 202 may be managed or supervised by a hypervisor.

In the network environment 200 of FIG. 2, the TMA device 202 is coupled to a plurality of server devices 204(1)-204(n) that hosts a plurality of databases 206(1)-206(n), and also to a plurality of client devices 208(1)-208(n) via communication network(s) 210. A communication interface of the TMA device 202, such as the network interface 114 of the computer system 102 of FIG. 1, operatively couples and communicates between the TMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TMA devices that efficiently manage large numbers of tasks in a multi-platform environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TMA device 202 may be a standalone device or integrated with one or more other devices or apparatuses, such as one or more of the server devices 204(1)-204(n), for example. In one particular example, the TMA device 202 may include or be hosted by one of the server devices 204(1)-204(n), and other arrangements are also possible. Moreover, one or more of the devices of the TMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store task rules, task queueing data, task status data, and any other data that relates to task management and administration.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TMA device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TMA device 202, the server devices 204(1)-204(n), or the client devices 208(1)-208(n), for example, may be configured to operate as virtual instances on the same physical machine. In other words, one or more of the TMA device 202, the server devices 204(1)-204(n), or the client devices 208(1)-208(n) may operate on the same physical device rather than as separate devices communicating through communication network(s) 210. Additionally, there may be more or fewer TMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
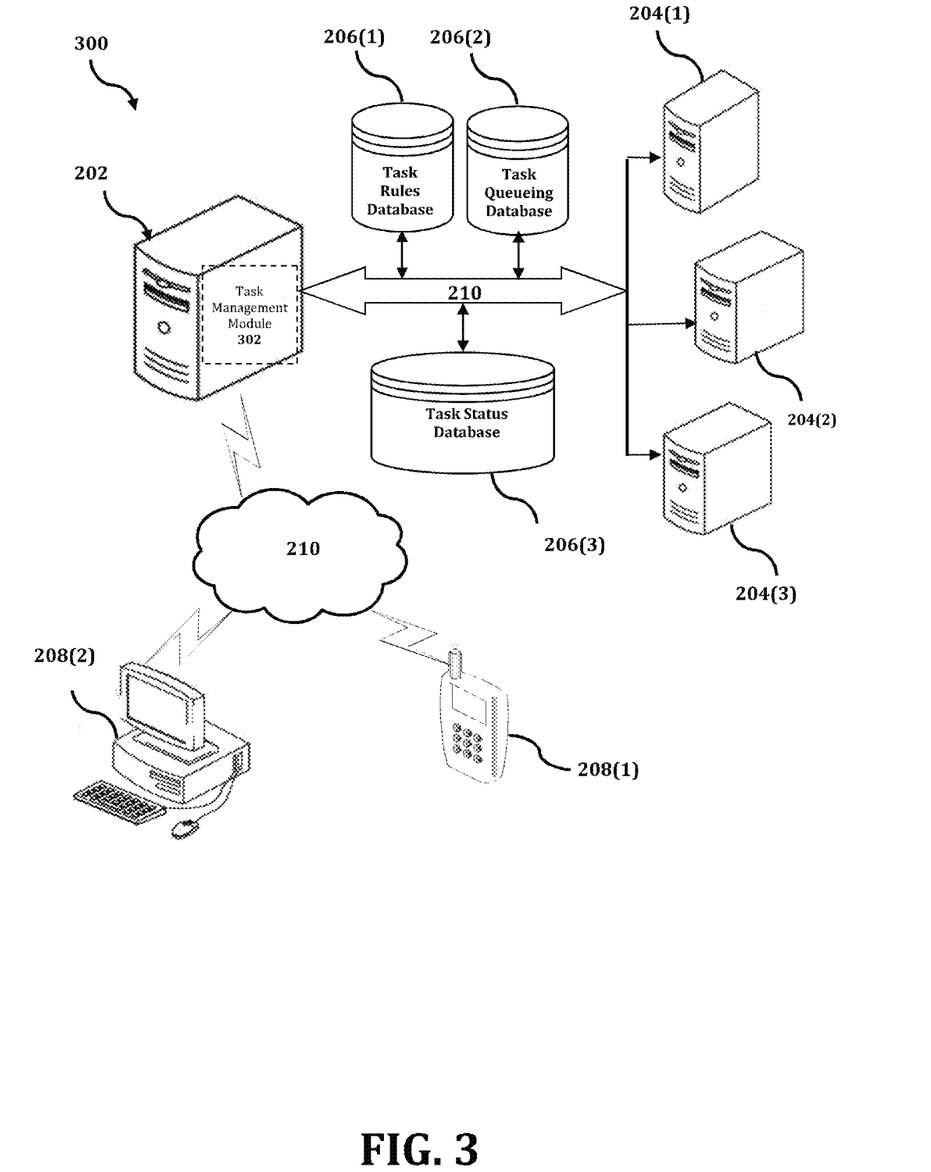
FIG. 3 shows an exemplary system for managing tasks in a multi-platform environment.

The TMA device 202 is described and shown in FIG. 3 as including a task management module 302, although it may include other modules, databases, or applications, for example. As will be described below, the task management module 302 is configured to process large numbers of task management requests in order to manage tasks in a multi-platform environment in an automated, efficient, scalable, and reliable manner.

An exemplary process 300 for managing tasks in a multi-platform environment by utilizing the network environment of FIG. 2 is shown as being executed in FIG. 3. Specifically, a first client device 208(1), a second client device 208(2), a first server device 204(1), a second server device 204(2), and a third server device 204(3) are illustrated as being in communication with TMA device 202. In this regard, the first client device 208(1) and the second client device 208(2) may be "clients" of the TMA device 202 and are described herein as such. Nevertheless, it is to be known and understood that the first client device 208(1) and/or the second client device 208(2) need not necessarily be "clients" of the TMA device 202, or any entity described in association therewith herein. Any additional or alternative relationship may exist between either or both of the first client device 208(1) and the second client device 208(2) and the TMA device 202, or no relationship may exist.

The first server device 204(1), the second server device 204(2), and the third server device 204(3) may represent different types of platforms. For example, the platforms may include database platforms, such as a SQL database platform, an Oracle database platform, or a Sybase database platform; server platforms, such as a Unix platform, a Windows platform, a mainframe platform, or a midrange platform; and directory services platforms, such as an active directory platform or a KEON platform.

Further, TMA device 202 is illustrated as being able to access a task rules database 206(1), a task queueing database 206(2), and a task status database 206(3). The task management module 302 may be configured to access these databases for implementing a process for managing tasks in a multi-platform environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TMA device 202 via broadband or cellular communication. Of course, these embodiments are merely exemplary and are not limiting or exhaustive.

Upon being started, the task management module 302 executes a process for managing tasks in a multi-platform environment. An exemplary process for managing tasks in a multi-platform environment is generally indicated at flowchart 400 in FIG. 4.

Figure 4:
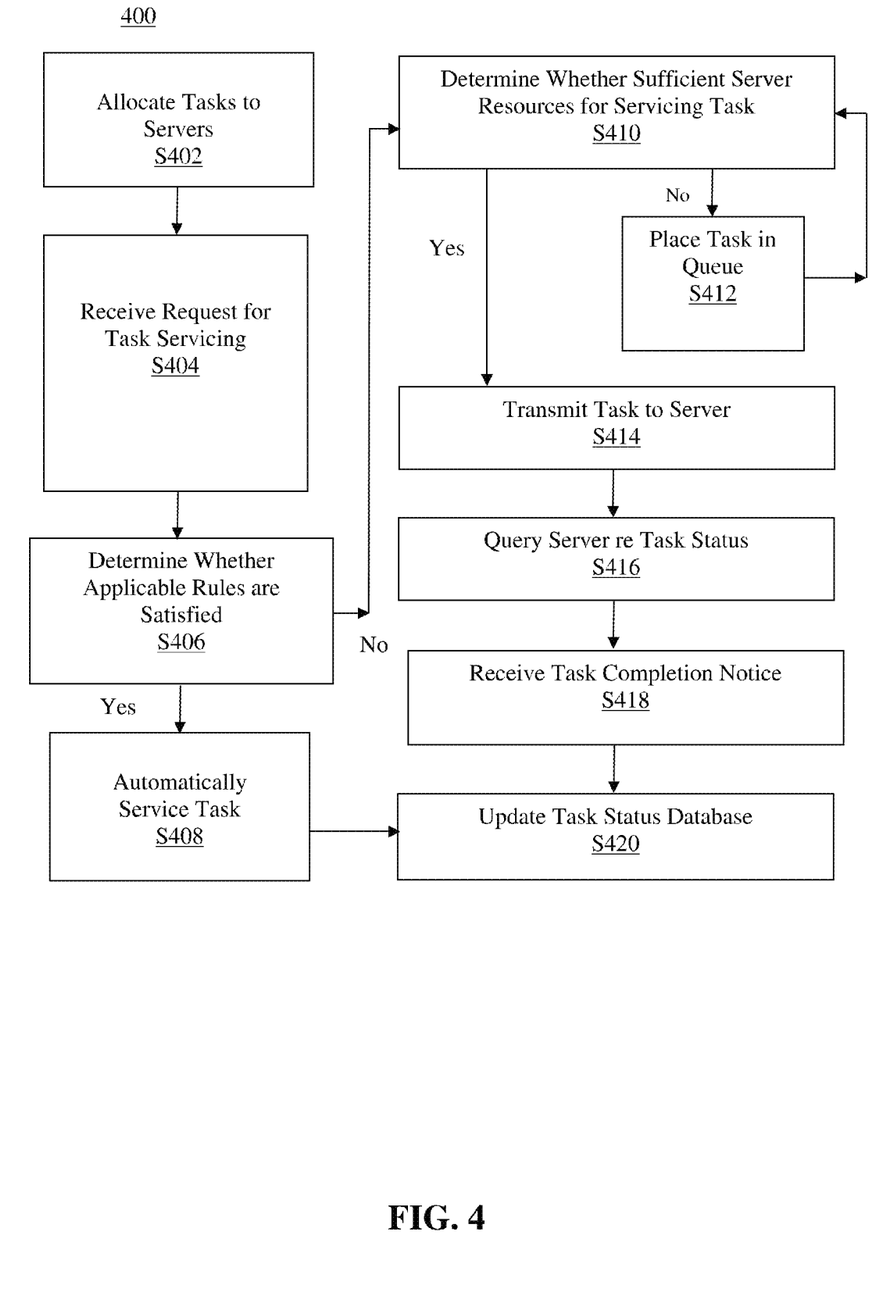
FIG. 4 is a flowchart of an exemplary method for managing tasks in a multi-platform environment.

In the process 400 of FIG. 4, at step S410, the task management module 302 allocates tasks to servers. In an exemplary embodiment, the task management module 302 may be configured to periodically transmit requests for tasks to one or more task provider server devices, and when responses to the requests are received, to associate each respective task with a corresponding service hosting server device. The transmissions of requests for tasks may occur at predetermined intervals, such as, for example, every 30 seconds, every 60 seconds, every 5 minutes, or every hour.

In an exemplary embodiment, the tasks to be allocated may include adding a database service account, such as a Structured Query Language (SQL) database service account, at a particular service hosting server device; deleting a database service account, such as an SQL database service account, at a particular service hosting server device; and/or resetting an access password, such as a windows active directory access password, at a particular service hosting server device. Alternatively, any other type of task and/or number of tasks may be allocated.

In an exemplary embodiment, when the task management module 302 receives a response to a request for tasks, each task included in the response may include a respective device identifier, such as, for example, an Internet Protocol (IP) address of a particular server device. As a result, the allocation of each respective task to a corresponding service hosting server device may be performed based on the respective device identifier that is included in each task.

Referring again to the process 400 of FIG. 4, in step S404, the task management module 302 receives a request for the servicing of a set of tasks from a client device 208. In an exemplary embodiment, a user interface that is administered by the TMA device 202 may appear on a display of a client device 208, and a user of the client device 208 may select one or more tasks to be serviced, such as, for example, a set of tasks that are associated with a particular server device 204.

In step S406, the task management module 302 determines whether one or more rules is applicable to any of the tasks that are the subject of the request received in step S404, and whether the applicable rules are satisfied. In an exemplary embodiment, the task management module 302 may access the task rules database 206(1) to determine which rules are applicable to a particular task. In an exemplary embodiment, a task may be associated with an authentication rule that relates to determining whether a user of the client device 208 is an authorized user, and a determination as to whether the authentication rule is satisfied may be made by checking user authentication credentials.

When the task management module 302 determines that the applicable rules for a particular task are satisfied, the process 400 proceeds to step S408. In step S408, the task management module 302 automatically services the task. For example, if the requested task is a deletion of an SQL database service account at a particular server device 204, and the user of the client device 208 is determined as being an authorized user, the deletion of the SQL database service account may be automatically performed by the task management module 302. In this manner, because many tasks may be automatically performed by the task management module 302 at the TMA device 202 instead of being executed by a local administrator at either of the server device 204 or the client device 208, the process of servicing tasks is much more centralized and efficient, and overall system security is increased by such centralization.

When the task management module 302 determines that at least one applicable rule is not satisfied, the process 400 process to step S410. In step S410, the task management module 302 determines whether the corresponding service hosting server device has sufficient resources to service the task(s) that are the subject of the request received in step S404. In an exemplary embodiment, the task management module 302 may transmit a query to the corresponding service hosting server device regarding its available resources, and when a response to the query is received, a determination is made based on the response to the query.

When a determination is made that the corresponding service hosting server device is overloaded and/or does not have sufficient resources to service the task(s), then in step S412, the task(s) are place in a queue. In an exemplary embodiment, the placement of one or more tasks into a queue may be performed by transmitting the one or more tasks to the task queueing database 206(2), and the tasks may be queued for a predetermined time interval, such as 30 second, 60 seconds, 5 minutes or one hour. Then, when the predetermined time interval has expired, the process 400 may loop back to step S410 in order to determine whether sufficient resources have become available for the servicing of the tasks.

When a determination is made that the corresponding service hosting server device has sufficient resources to service the task(s), then in step S414, the tasks are transmitted to the corresponding service hosting server device. Then, when the tasks are received by the corresponding service hosting server device, the servicing of the tasks is performed by the corresponding service hosting server device.

At step S416, the task management module 302 transmits a task status query to the corresponding service hosting device to determine a status of the task. In an exemplary embodiment, a response to the task status query may include any one or more of information that indicates whether the task is currently being serviced, information that indicates whether the task has been completed, and information that indicates whether the task has been placed in a queue. Alternatively, the response to the task status query may include any other type of information that is relevant to a status of a task. When a task has been completed, then at step S418, a task completion notice is received by the task management module 302 from the corresponding service hosting server device.

When the task management module 302 determines that a particular task has been serviced, for example, after automatically servicing the task in step S408 or upon receiving a task completion notice in step S418, then in step S420, the task management module 302 updates the task status database 206(3).

In an exemplary embodiment, the TMA device 202 and the task management module 302 may be configured to simultaneously manage a large number of tasks that correspond to many different types of service hosting server devices and many different types of platforms. For example, a first service hosting server device 204(1) may host an SQL database platform; a second service hosting server device 204(2) may host a Windows active server platform; a third service hosting server device 204(3) may host a mainframe platform; and a fourth service hosting service device 204(4) may host a Unix platform, although many other types of platforms are possible. Further, in an exemplary embodiment, a number of tasks being managed and/or serviced at any given time may be relatively large, i.e., on the order of hundreds, thousands, tens of thousands, or hundreds of thousands. In this aspect, the systems and methods according to one or more exemplary embodiments provide an advantage of a capability of servicing tasks associated with multiple platforms simultaneously by using a single centralized TMA device 202.

Figure 5:
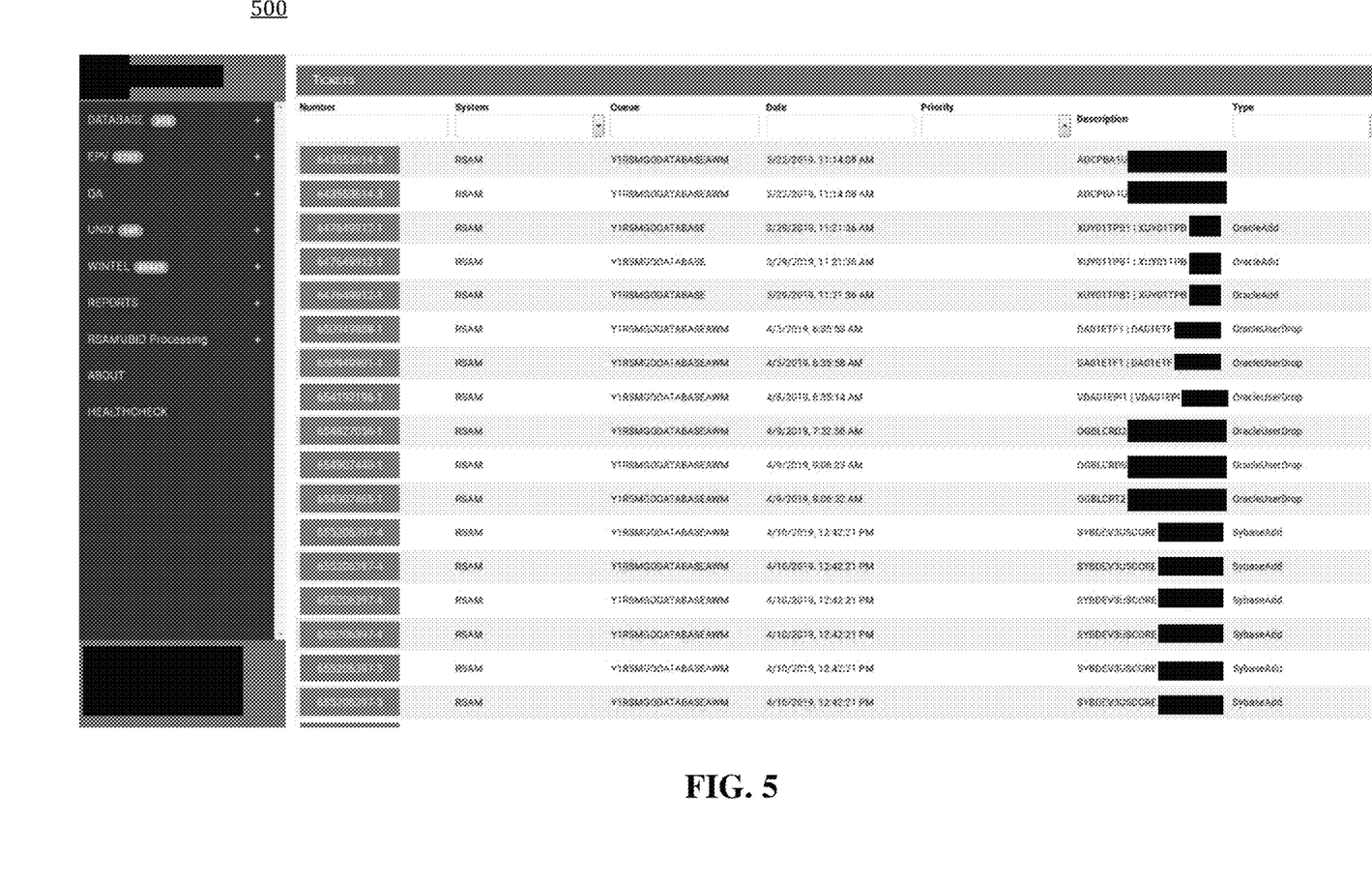
FIG. 5 illustrates a first screen shot that appears on a display of a system for managing tasks in a multi-platform environment, according to an exemplary embodiment.

Referring to FIG. 5, a first screen shot that appears on a display of a system for managing tasks in a multi-platform environment according to an exemplary embodiment is illustrated. The screen shot of FIG. 5 illustrates a ticket queue page, which aggregates task requests (also referred to herein as "tickets") across multiple request systems into a single queue, in order to enable a user of the TMA device 202 to select a specific task request from within the queue and provision access thereto.

Figure 6:
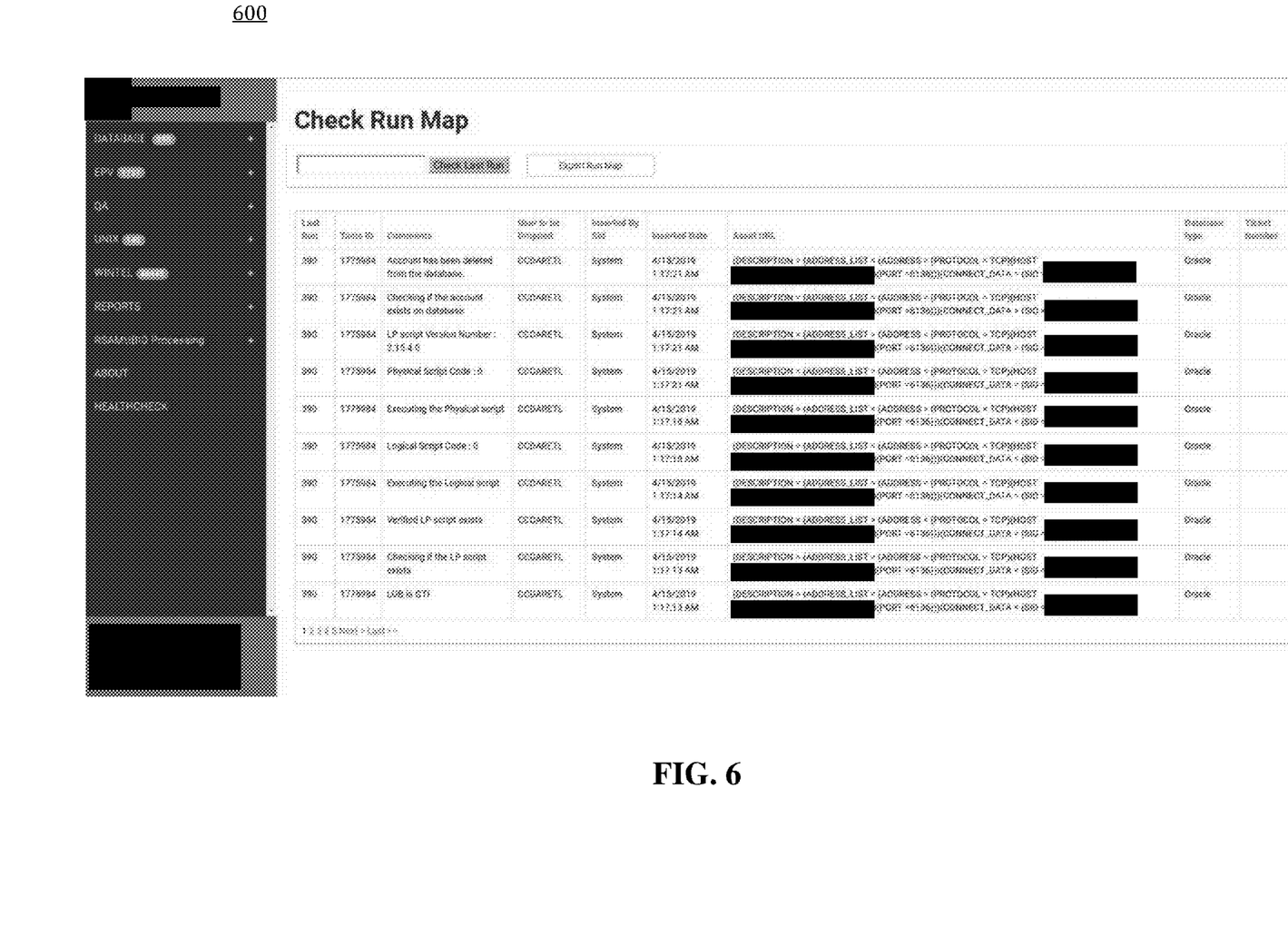
FIG. 6 illustrates a second screen shot that appears on a display of a system for managing tasks in a multi-platform environment, according to an exemplary embodiment.

Referring to FIG. 6, a second screen shot that appears on a display of a system for managing tasks in a multi-platform environment according to an exemplary embodiment is illustrated. The screen shot of FIG. 6 illustrates a check run map that enables a user of the TMA device 202 to see information that relates to actions that have been performed with respect to a particular task for which a servicing request has been received and/or a particular asset, such as a server device 204. Such information may be especially useful for troubleshooting work flows or determining points of failure.

Figure 7:
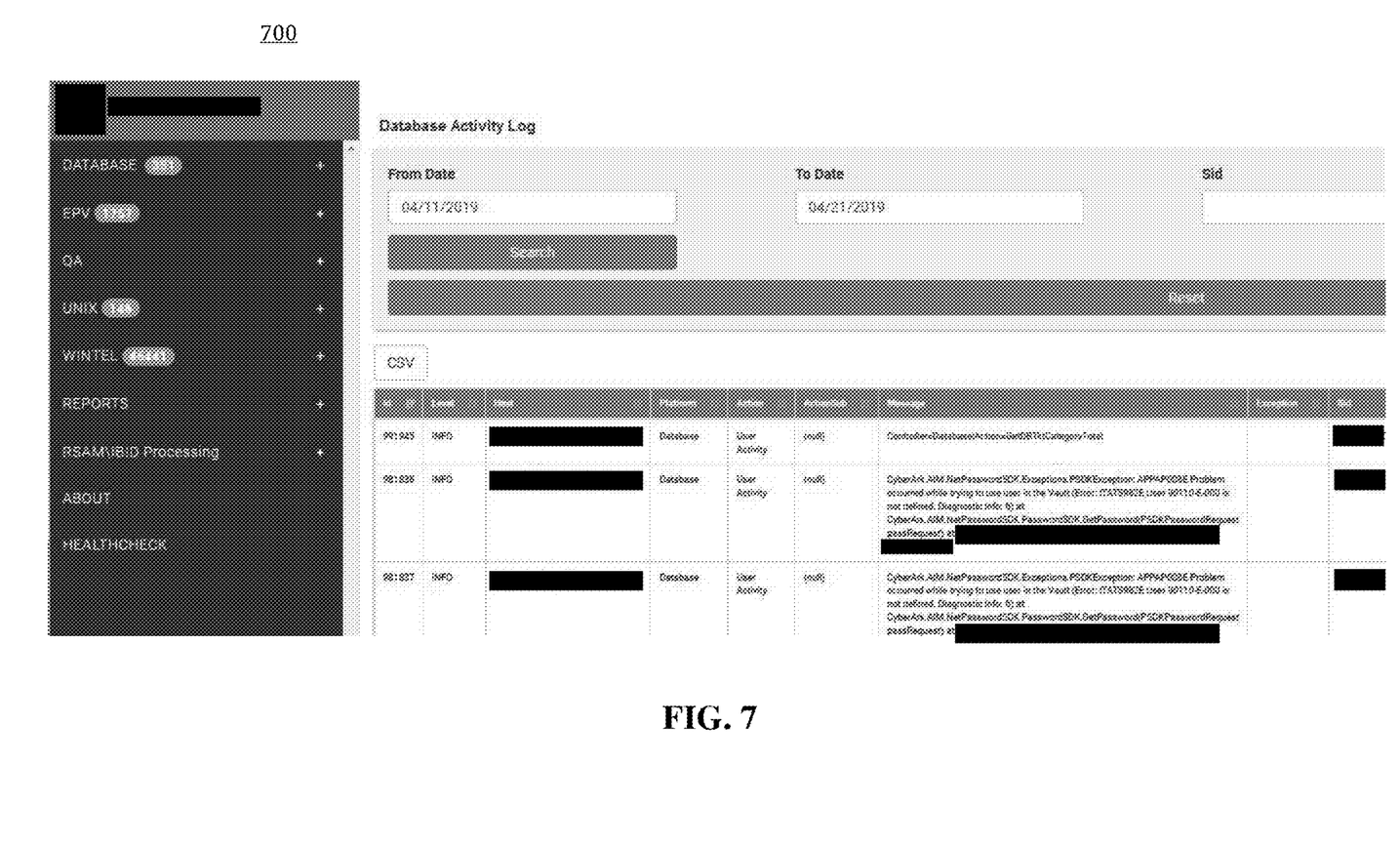
FIG. 7 illustrates a third screen shot that appears on a display of a system for managing tasks in a multi-platform environment, according to an exemplary embodiment.

Referring to FIG. 7, a third screen shot that appears on a display of a system for managing tasks in a multi-platform environment according to an exemplary embodiment is illustrated. The screen shot of FIG. 7 illustrates a database activity log, which displays a step-by-step clickthrough and an execution of workflows and all actions taken at the TMA device 202 with respect to a database platform.

Figure 8:
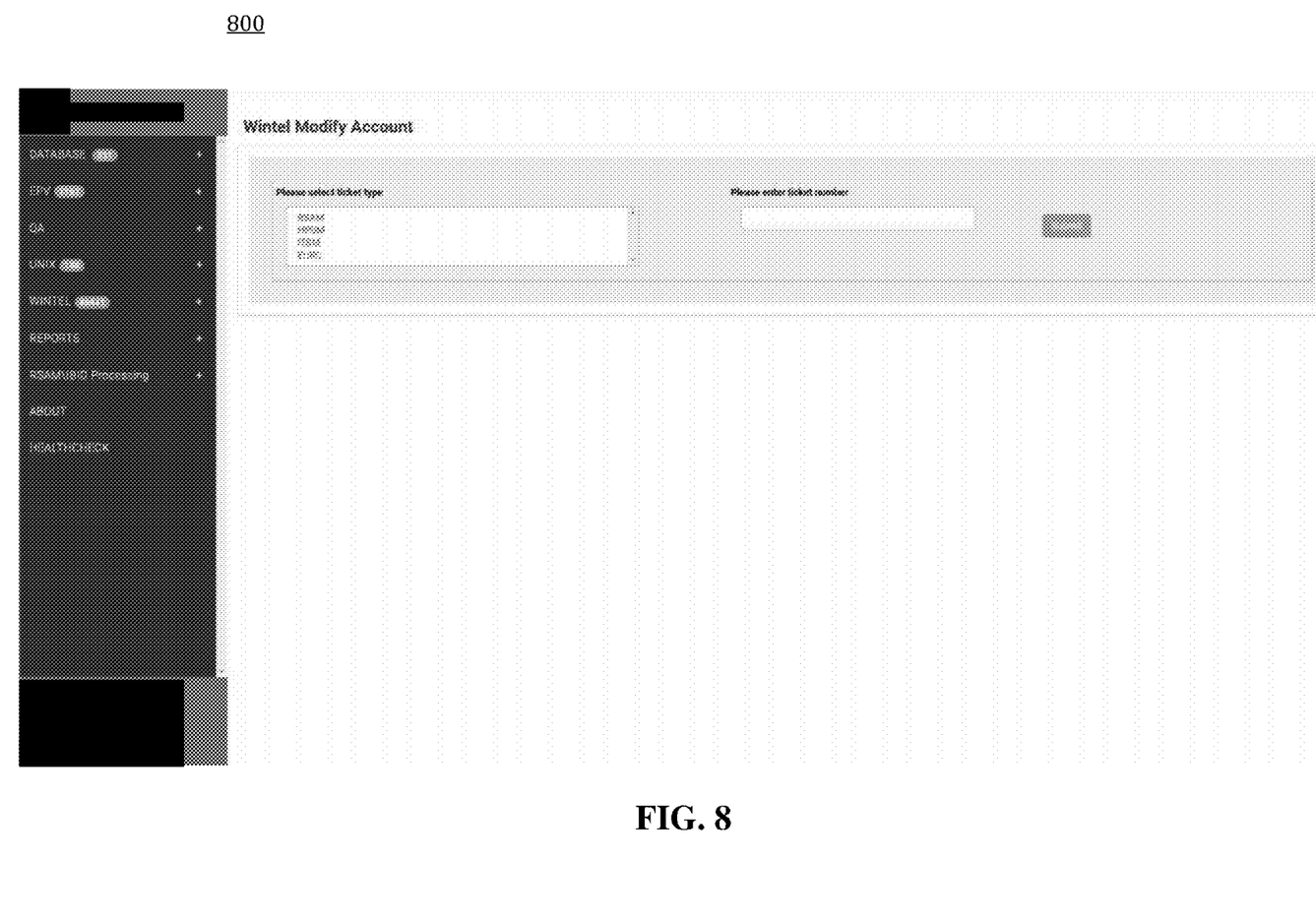
FIG. 8 illustrates a fourth screen shot that appears on a display of a system for managing tasks in a multi-platform environment, according to an exemplary embodiment.

Referring to FIG. 8, a fourth screen shot that appears on a display of a system for managing tasks in a multi-platform environment according to an exemplary embodiment is illustrated. The screen shot of FIG. 8 illustrates a ticket validation page that relates to a Wintel platform. When a user of the TMA device 202 selects a ticket type and a ticket number, thereby specifying a task for which a servicing request has been received (i.e., a ticket), the task management module 302 validates whether the ticket matches the corresponding service name and also whether the ticket has been approved.

Accordingly, with this technology, an optimized process for managing tasks in a multi-platform environment is provided. The optimized process enables a user to efficiently and automatically process large numbers of task requests in a manner that increases system security and robustness.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing tasks in a multi-platform environment, the method being implemented by a processor on a computing device, the method comprising:
    automatically aggregating, by the processor, a plurality of tasks from a plurality of task request platforms;
    generating, by the processor, a single listing of the plurality of tasks, the single listing including a user selectable graphical element for each of the plurality of tasks;
    generating, by the processor, a check run map for the plurality of tasks, the check run map including historical data that relates to previous servicing actions performed for each of the plurality of tasks;
    displaying, by the processor via a user interface, the single listing and the check run map on a client device;
    allocating, by the processor from among the plurality of tasks, a first set of tasks to a first server device from among a plurality of server devices based on a hosting server device type and a server platform type;
    receiving, by the processor from the client device via a communication interface, a request for servicing at least one task from among the first set of tasks, the request corresponding to a user selection on the user interface;
    determining, by the processor, whether at least one rule applies to the at least one task;
    determining, by the processor, whether each of the determined at least one rule is satisfied;
    when each of the determined at least one rule is satisfied, automatically servicing, by the processor, the at least one task;
        updating, by the processor, a database activity log with information that relates to the servicing, the database activity log including a step-by-step clickthrough of executed workflow actions taken by the processor; and
    when at least one of the determined at least one rule is not satisfied,
        determining, by the processor, whether the first server device has a quantity of a processing resource that corresponds to the at least one task;
        transmitting, by the processor via the communication interface, the at least one task to the first server device when the first server device has the quantity of the processing resource that corresponds to the at least one task; and
        receiving, by the processor via the communication interface when the at least one task has been serviced by the first server device, a notification of completion of the at least one task.

2. The method of claim 1, wherein the plurality of tasks includes at least one from among adding a database service account, deleting a database service account, and resetting an access password.

3. The method of claim 1, wherein the allocating includes using a respective device identifier that is included in each task from among the plurality of tasks to determine a corresponding server device from among the plurality of server devices for the respective task.

4. The method of claim 3, wherein each respective device identifier includes an Internet protocol (IP) address of the corresponding server device.

5. The method of claim 1, wherein the at least one rule includes an authentication rule that relates to determining whether a user for the at least one task is an authorized user.

6. The method of claim 1, wherein, when the at least one of the at least one rule is not satisfied, the method further comprises:
    querying, prior to the transmitting the at least one task to the first server for servicing, the first server device to determine whether the first server device has sufficient resources to service the at least one task;
    when a determination is made that the first server device is overloaded, transmitting the at least one task to a task queueing database; and
    after a predetermined time interval has passed, querying the first server device to determine whether the sufficient resources to service the at least one task have become available.

7. The method of claim 1, wherein when the at least one of the at least one rule is not satisfied, the method further comprises querying, after the transmitting the at least one task to the first server device for servicing, the first server device with respect to whether the at least one task has been completed.

8. The method of claim 7, further comprising using the notification of completion of the at least one task to verify that the at least one task has been completed and storing, in a task status database, information that indicates a status of the at least one task.

9. The method of claim 8, wherein the information that indicates the status of the at least one task includes information that indicates whether the at least one task is currently being serviced, information that indicates whether the at least one task has been completed, and information that indicates whether the at least one task has been placed in a queue.

10. The method of claim 1, further comprising determining, for each respective task included in the plurality of tasks, a corresponding server device from among the plurality of server devices, and allocating each respective task to the corresponding server device.

11. A computing device configured to implement an execution of a method for managing tasks in a multi-platform environment, the computing device comprising:

a display screen;
a processor;
a memory; and
a communication interface coupled to each of the processor, the memory, and the display screen,
wherein the processor is configured to:
automatically aggregate a plurality of tasks from a plurality of task request platforms;
generate a single listing of the plurality of tasks, the single listing including a user selectable graphical element for each of the plurality of tasks;
generate a check run map for the plurality of tasks, the check run map including historical data that relates to previous servicing actions performed for each of the plurality of tasks;
display, via a user interface, the single listing and the check run map on a client device;
allocate, from among the plurality of tasks, a first set of tasks to a first server device from among a plurality of server devices based on a hosting server device type and a server platform type;
receive, from the client device, a request for servicing at least one task from among the first set of tasks, the request corresponding to a user selection on the user interface;
determine whether at least one rule applies to the at least one task;
determine whether each of the determined at least one rule is satisfied;
when each of the determined at least one rule is satisfied,
automatically service the at least one task;
update a database activity log with information that relates to the servicing, the database activity log including a step-by-step clickthrough of executed workflow actions taken by the processor; and
when at least one of the determined at least one rule is not satisfied,
determine whether the first server device has a quantity of a processing resource that corresponds to the at least one task;
transmit the at least one task to the first server device when the first server device has the quantity of the processing resource that corresponds to the at least one task; and
receive, when the at least one task has been serviced by the first server device, a notification of completion of the at least one task.

12. The computing device of claim 11, wherein the plurality of tasks includes at least one from among adding a database service account, deleting a database service account, and resetting an access password.

13. The computing device of claim 11, wherein the processor is further configured to use a respective device identifier that is included in each task from among the plurality of tasks to determine a corresponding server device from among the plurality of server devices for the respective task.

14. The computing device of claim 13, wherein each respective device identifier includes an Internet protocol (IP) address of the corresponding server device.

15. The computing device of claim 11, wherein the at least one rule includes an authentication rule that relates to determining whether a user for the at least one task is an authorized user.

16. The computing device of claim 11, wherein when the at least one of the at least one rule is not satisfied, the processor is further configured to:
query, prior to transmitting the at least one task to the first server device for servicing, the first server device to determine whether the first server has sufficient resources to service the at least one task;
when a determination is made that the first server device is overloaded, transmit the at least one task to a task queueing database; and
after a predetermined time interval has passed, query the first server device to determine whether the sufficient resources to service the at least one task have become available.

17. The computing device of claim 11, wherein when the at least one of the at least one rule is not satisfied, the processor is further configured to query, after transmitting the at least one task to the first server for servicing, the first server device with respect to whether the at least one task has been completed.

18. The computing device of claim 17, wherein the processor is further configured to use the notification of completion of the at least one task to verify that the at least one task has been completed, and to store, in a task status database, information that indicates a status of the at least one task.

19. The computing device of claim 18, wherein the information that indicates the status of the at least one task includes information that indicates whether the at least one task is currently being serviced, information that indicates whether the at least one task has been completed, and information that indicates whether the at least one task has been placed in a queue.

20. The computing device of claim 11, wherein the processor is further configured to determine, for each respective task included in the plurality of tasks, a corresponding server device from among the plurality of server devices, and to allocate each respective task to the corresponding server device.

* * * * *